(12) United States Patent
Dahl-Nielsen et al.

(10) Patent No.: US 11,391,406 B2
(45) Date of Patent: Jul. 19, 2022

(54) SYSTEM AND METHOD FOR REPAIRING AN UNDERGROUND PIPELINE

(71) Applicant: The Charles Machine Works, Inc., Perry, OK (US)

(72) Inventors: Peder Dahl-Nielsen, Malling (DK); Per Lundgren, Gjerlev J (DK); Cory J. Steckmann, Oconomowoc, WI (US); Aidan F. Kelly, Lake Mills, WI (US); Douglas Ronald Warren, Prairie du Sac, WI (US)

(73) Assignees: The Charles Machine Works, Inc., Perry, OK (US); PER AARSLEFF A/S

( * ) Notice: Subject to any disclaimer, the term of this patent is extended or adjusted under 35 U.S.C. 154(b) by 0 days.

(21) Appl. No.: 17/095,095

(22) Filed: Nov. 11, 2020

(65) Prior Publication Data
US 2021/0172556 A1 Jun. 10, 2021

Related U.S. Application Data

(60) Provisional application No. 62/933,679, filed on Nov. 11, 2019.

(51) Int. Cl.
*F16L 55/165* (2006.01)

(52) U.S. Cl.
CPC ................ *F16L 55/1651* (2013.01)

(58) Field of Classification Search
CPC .............. F16L 55/1651; F16L 55/1654; B29C 63/343; B29C 63/0095
USPC ........................ 138/98, 97; 156/294; 264/269
See application file for complete search history.

(56) References Cited

U.S. PATENT DOCUMENTS

| | | | |
|---|---|---|---|
| 4,135,958 A | 1/1979 | Wood | |
| 4,581,247 A | 4/1986 | Wood | |
| 4,680,066 A | 7/1987 | Wood | |
| 5,280,811 A * | 1/1994 | Catallo | ............... B29C 63/0095 138/97 |

(Continued)

FOREIGN PATENT DOCUMENTS

| | | |
|---|---|---|
| AU | 2003024457 B1 | 12/2004 |
| DE | 10221149 A1 | 11/2003 |

(Continued)

OTHER PUBLICATIONS

International Searching Authority, "PCT International Search Report", 7 pages, dated Feb. 24, 2021, Korean Intellectual Property Office.

(Continued)

*Primary Examiner* — Patrick F Brinson
(74) *Attorney, Agent, or Firm* — Tomlinson McKinstry, P.C.

(57) ABSTRACT

A system for repairing an underground pipeline using a light source. A resin soaked tubular liner is inverted within an underground liner. A tubular bladder is subsequently inflated within the tubular liner. A pull line is attached to a free end of the bladder. The light source is attached to the pull line. The bladder pulls with the pull line and light source into the liner as the bladder is inverted within the liner. The light source is subsequently activated and separated from the pull line. The light source is then pulled through the bladder and liner, curing the liner as it moves.

20 Claims, 10 Drawing Sheets

(56) References Cited

U.S. PATENT DOCUMENTS

| | | | |
|---|---|---|---|
| 5,868,169 A * | 2/1999 | Catallo | F16L 58/02 |
| | | | 138/98 |
| 5,915,419 A | 6/1999 | Tweedie et al. | |
| 5,927,341 A | 7/1999 | Taylor | |
| 6,029,726 A | 2/2000 | Tweedie et al. | |
| 6,039,079 A | 3/2000 | Kiest, Jr. | |
| 6,068,725 A | 5/2000 | Tweedie et al. | |
| 6,199,591 B1 | 3/2001 | Kiest, Jr. et al. | |
| 6,371,631 B1 | 4/2002 | Reutemann | |
| 6,427,726 B1 * | 8/2002 | Kiest, Jr. | F16L 55/1651 |
| | | | 138/97 |
| 6,482,280 B1 | 11/2002 | Kiest, Jr. et al. | |
| 6,520,719 B1 | 2/2003 | Tweedie et al. | |
| 6,708,728 B2 | 3/2004 | Driver et al. | |
| 6,782,932 B1 | 8/2004 | Reynolds, Jr. et al. | |
| 7,073,536 B2 | 7/2006 | Blackmore et al. | |
| 8,561,662 B2 | 10/2013 | Moeskjaer et al. | |
| 8,869,839 B1 | 10/2014 | D'Hulster | |
| 9,248,605 B2 | 2/2016 | Quitter | |
| 9,453,607 B2 | 9/2016 | Moeskjaer et al. | |
| 9,920,872 B2 | 3/2018 | Lokkinen | |
| 10,591,102 B2 | 3/2020 | Mathey et al. | |
| 2001/0046652 A1 | 11/2001 | Ostler et al. | |
| 2003/0213556 A1 | 11/2003 | Blackmore et al. | |
| 2005/0154262 A1 | 7/2005 | Banik et al. | |
| 2005/0222295 A1 | 10/2005 | Siegel | |
| 2006/0090804 A1 | 5/2006 | Driver et al. | |
| 2006/0130923 A1 | 6/2006 | Lepola et al. | |
| 2007/0261751 A1 | 11/2007 | Lepola | |
| 2009/0014080 A1 | 1/2009 | Blackmore et al. | |
| 2010/0051168 A1 | 3/2010 | Moeskjaer et al. | |
| 2014/0261832 A1 * | 9/2014 | Kiest, Jr. | B29C 73/025 |
| | | | 138/97 |
| 2014/0311607 A1 * | 10/2014 | Mathey | F16L 55/1651 |
| | | | 138/98 |
| 2016/0010781 A1 * | 1/2016 | Kiest, Jr. | F16L 55/16455 |
| | | | 138/98 |
| 2016/0195211 A1 * | 7/2016 | Lokkinen | F16L 55/179 |
| | | | 138/98 |
| 2018/0106413 A1 * | 4/2018 | Kuzniar | B29C 35/0805 |
| 2018/0162017 A1 * | 6/2018 | Kuzniar | B29C 35/0805 |
| 2018/0194072 A1 * | 7/2018 | Kuzniar | F16L 55/40 |
| 2018/0229424 A1 | 8/2018 | Bichler et al. | |
| 2019/0137027 A1 * | 5/2019 | Robinson | F16L 55/1653 |
| 2020/0049301 A1 | 2/2020 | Rasmussen et al. | |
| 2020/0300403 A1 | 9/2020 | Taylor | |

FOREIGN PATENT DOCUMENTS

| | | |
|---|---|---|
| DE | 102007038197 A1 | 2/2009 |
| DE | 102010035837 A1 | 3/2012 |
| EP | 0551790 A1 | 7/1993 |
| EP | 2141404 B1 | 4/2011 |
| EP | 2208920 B1 | 2/2012 |
| GB | 2342419 A | 4/2000 |
| JP | 2008142996 A | 6/2008 |
| JP | 2008175381 A | 7/2008 |
| KR | 100594825 B1 | 7/2006 |
| KR | 1020140111057 A | 9/2014 |
| WO | 9315131 A | 8/1993 |
| WO | 9501860 A | 1/1995 |
| WO | 9510726 A | 4/1995 |
| WO | 9618493 A | 6/1996 |
| WO | 2004104469 A1 | 12/2004 |

OTHER PUBLICATIONS

European Patent Office, "International Search Report", dated Apr. 11, 2018, 5 pages, European Patent Office.

International Searching Authority, "PCT International Search Report", dated May 21, 2008, 8 pages, European Patent Office.

Internaional Searching Authority "Written Opinion of the International Searching Authority", 5 pages, dated May 21, 2008, European Patent Office.

* cited by examiner

SYSTEM AND METHOD FOR REPAIRING AN UNDERGROUND PIPELINE

SUMMARY

The present invention is directed to a system comprising a flexible tubular liner, and a flexible tubular bladder. The liner is extendable into an elongate configuration. The bladder has opposed ends and is extendable and inflatable within the extended liner. The system also comprises a flexible and nontubular pull line having opposed ends. One end of the pull line is attached to the bladder adjacent one of the bladder's ends. The system further comprises a selectively actuatable light source attached to the pull line adjacent one of the pull line's ends.

The present invention is also directed to a method. The method comprises the steps of causing a flexible tubular liner to extend within a tubular pipe, and causing a tubular bladder to extend within the extended liner, the bladder having a free end and a fixed end. Extension of the bladder causes a flexible and nontubular pull line and a selectively actuatable light source attached to the pull line to travel within the bladder. The pull line has a free end and a fixed end. The fixed end of the pull line is attached to the bladder adjacent the bladder's free end.

DETAILED DESCRIPTION

Figure 1:
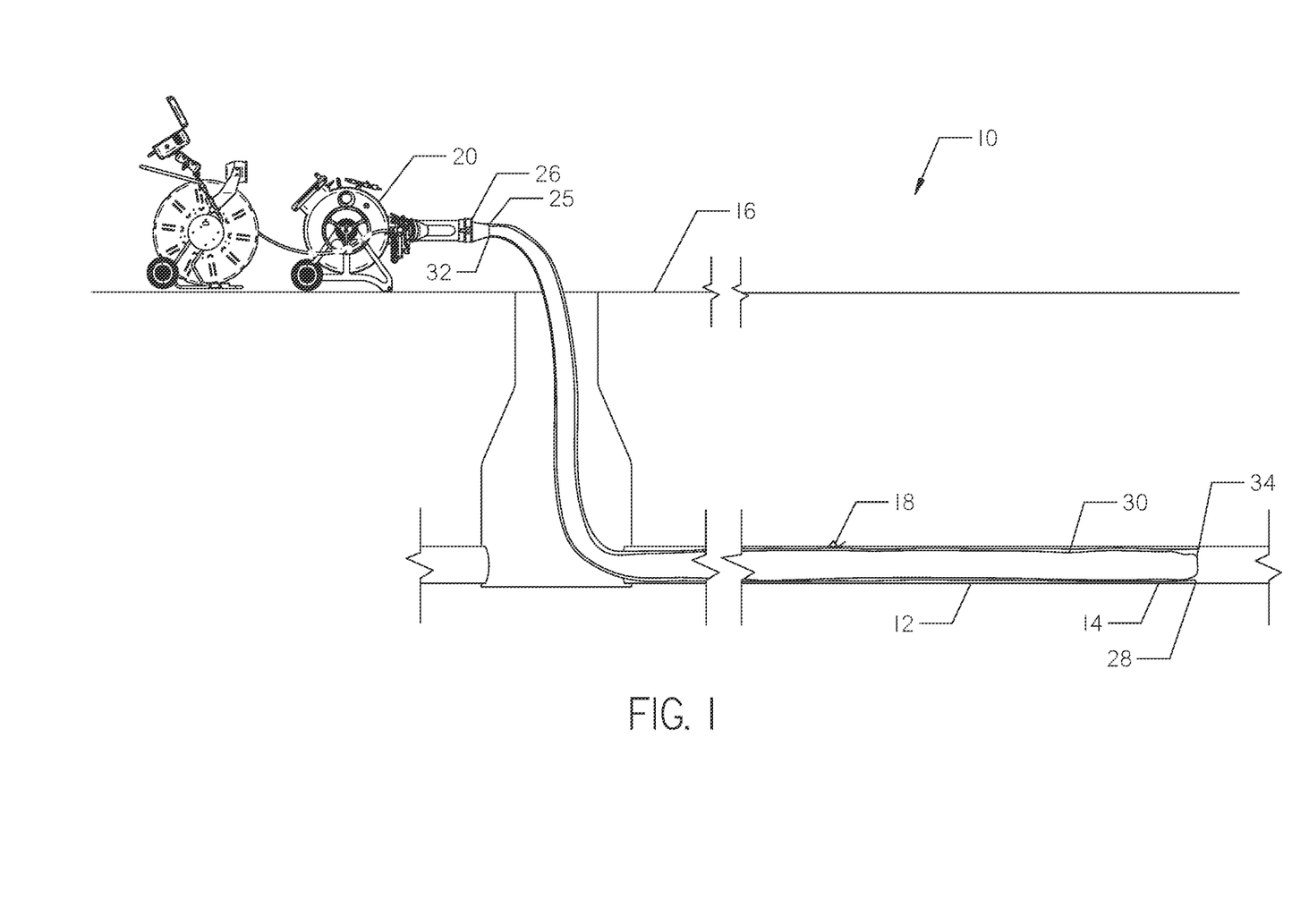
FIG. 1 is an illustration of a cured-in-place piping operation.

With reference to FIG. 1, a cured-in-place piping operation 10 is shown. Cured-in-place piping operations are performed to repair existing underground pipelines, such as a pipeline 12, shown in FIG. 1. The operation involves the installation of a resin saturated, tubular liner 14 within the pipeline 12 situated below a ground surface 16. The resin soaked liner 14 cures against the interior of the pipeline 12 and seals any cracks or damaged areas, such as the damaged area 18, shown in FIG. 1.

A pressurized inversion drum 20 situated at the ground surface 16 is used to install the flexible and tubular liner 14 within the existing pipeline 12. The interior of the liner 14 is typically made of felt, while the outside of the liner 14 is typically made of a water resistant material. In operation, the felt interior of the liner 14 is first filled with resin. The resin-filled liner 14 is flattened by running it through a roller table. The flattened liner 14 is then coiled around a reel 22 supported within an interior chamber 24 of the drum 20, as shown in FIG. 2.

Figure 2:
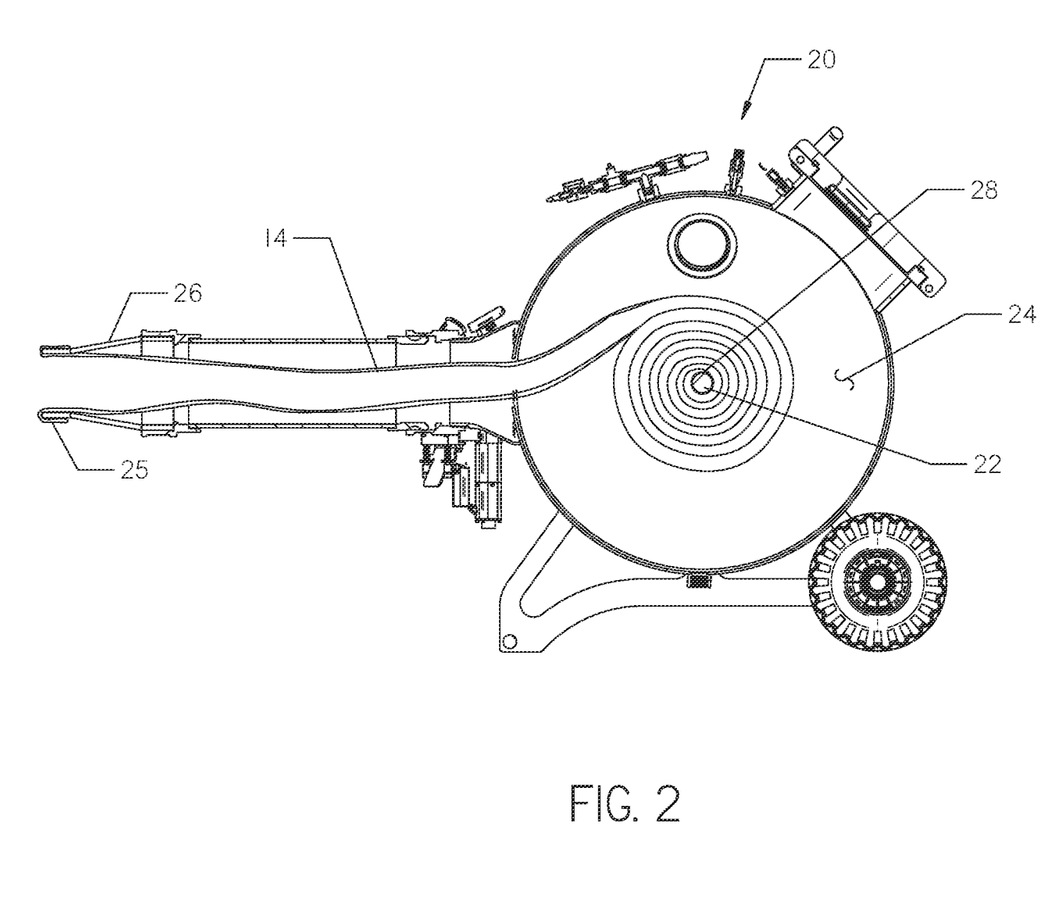
FIG. 2 is a side sectional view of the inversion drum shown in FIG. 1. A wet liner is shown wound around the reel inside of the drum. An end of the liner is shown disposed over the drum's nozzle.

Continuing with FIGS. 1 and 2, after the wet liner 14 is installed within the drum 20, a first end 25 of the liner 14, is disposed around a nozzle 26 supported on the drum 20, causing the first end 25 to be the fixed end of the liner 14. An opposed free end 28 of the liner 14 remains wound around the reel 22. After the first end 25 of liner 14 is disposed around the nozzle 26, the interior of the drum 20 may be pressurized.

The pressure inside of the drum 20 operates to invert and expand the liner 14 into the existing pipeline 12 as it is discharged from the nozzle 26. Because the liner 14 is inverted as it expands the length of the existing pipeline 12, the resin soaked surface of the liner 14 contacts the interior walls of the pipeline 12.

In some cases, a flexible and tubular bladder 30 may subsequently be expanded throughout the length of the installed wet liner 14. The bladder 30 is approximately the same length as the liner 14 and is inverted into the wet liner 14 in the same manner as the wet liner 14 is inverted into the pipeline 12. A fixed end 32 of the bladder 30 is disposed around the nozzle 26 and a free end 34 of the bladder 30 is wound around the reel 22. As the bladder 30 inverts within the wet liner 14, the bladder 30 inflates and pushes against the liner 14, thereby ensuring that the liner 14 contacts all of the interior walls of the pipeline 12. The bladder 30 may also be referred to as a calibration tube.

In some embodiments, water or steam is used to cure the resin. In alternative embodiments, LEDs emitting a specific wavelength of light may be used to cure the resin. For example, the LEDs may emit blue light. The resin may be formulated to cure upon exposure to a specific wavelength of light.

Figure 3:
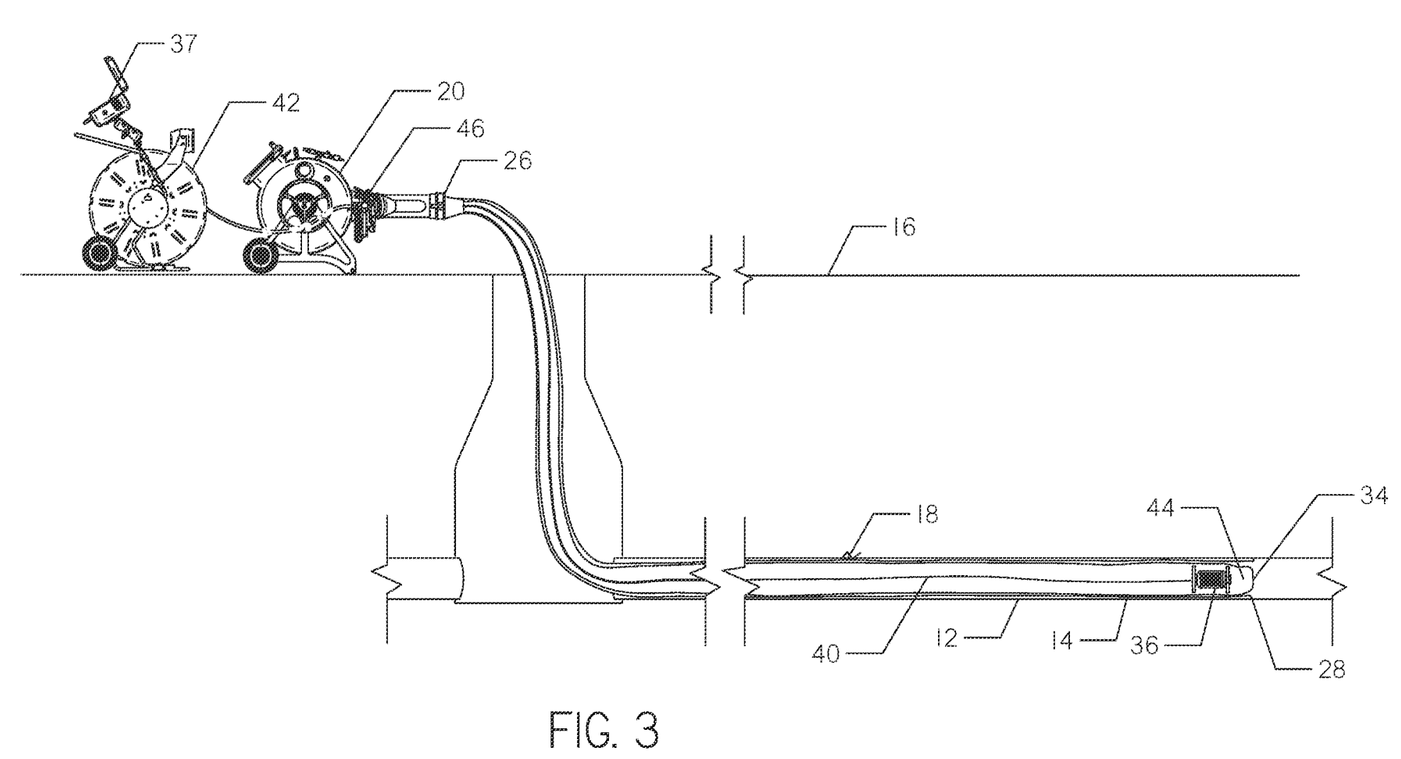
FIG. 3 is the illustration shown in FIG. 1, with a light source installed within the underground pipeline.
Figure 8:
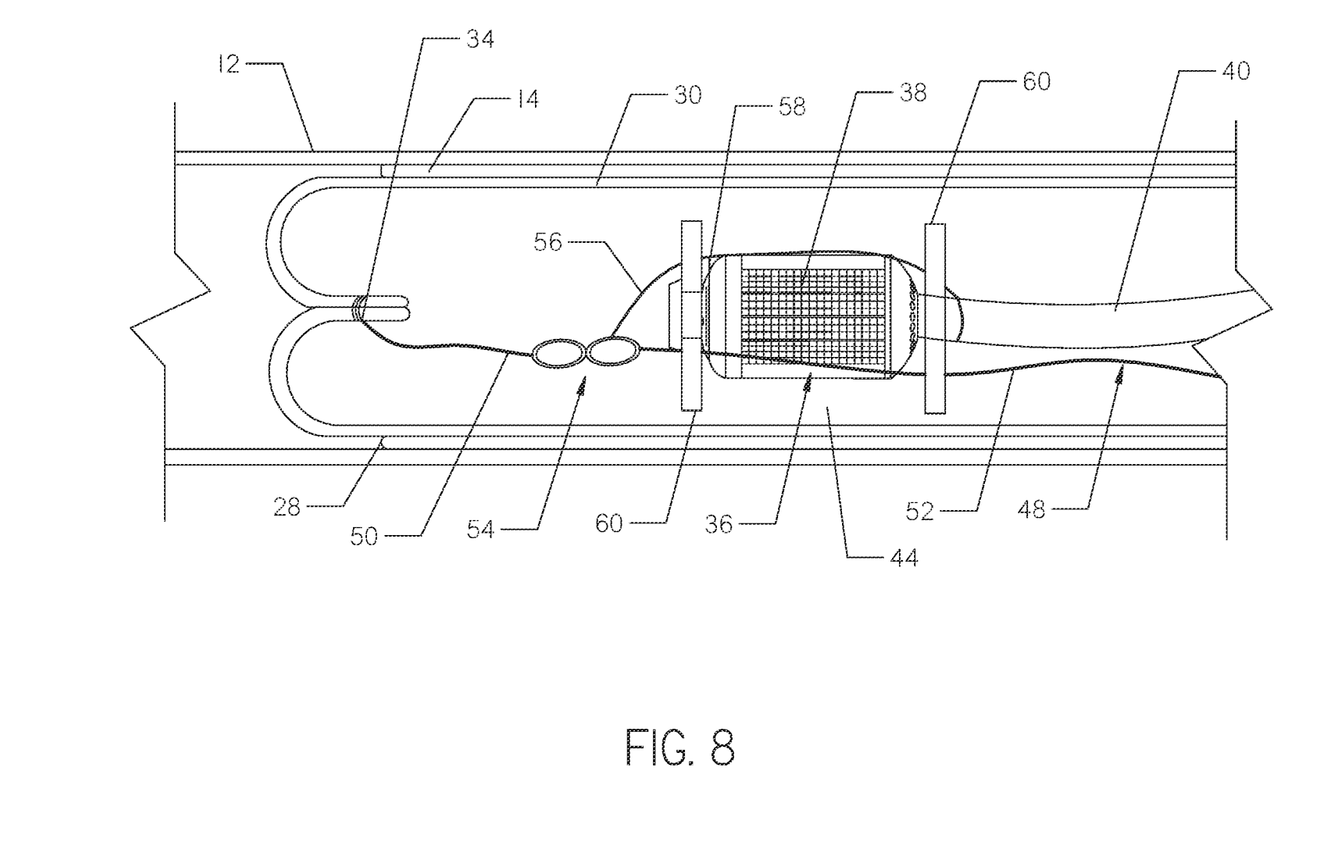
FIG. 8 is a sectional view of the pipeline at the starting point for the light source. The liner, bladder, pull line, and light source are shown installed within the pipeline.

With reference to FIG. 3, in order to use LEDs to cure the resin, a light source 36 supporting a plurality of LEDs 38, as shown in FIG. 8, is installed within the lined pipeline 12. The light source 36 may also include a camera in communication with a monitor 37, shown in FIGS. 3 and 4. An example light source is described in U.S. Pat. No. 8,561,662 issued to Moeskjaer, et al., the entire contents of which are incorporated herein by reference. The light source 36 is attached to a power line 40 supported on a reel 42. The power line 40 contains electrical cords used to power the LEDs 38. The power line 40 also supplies cool air to the LEDs 38 during operation.

Figure 4:
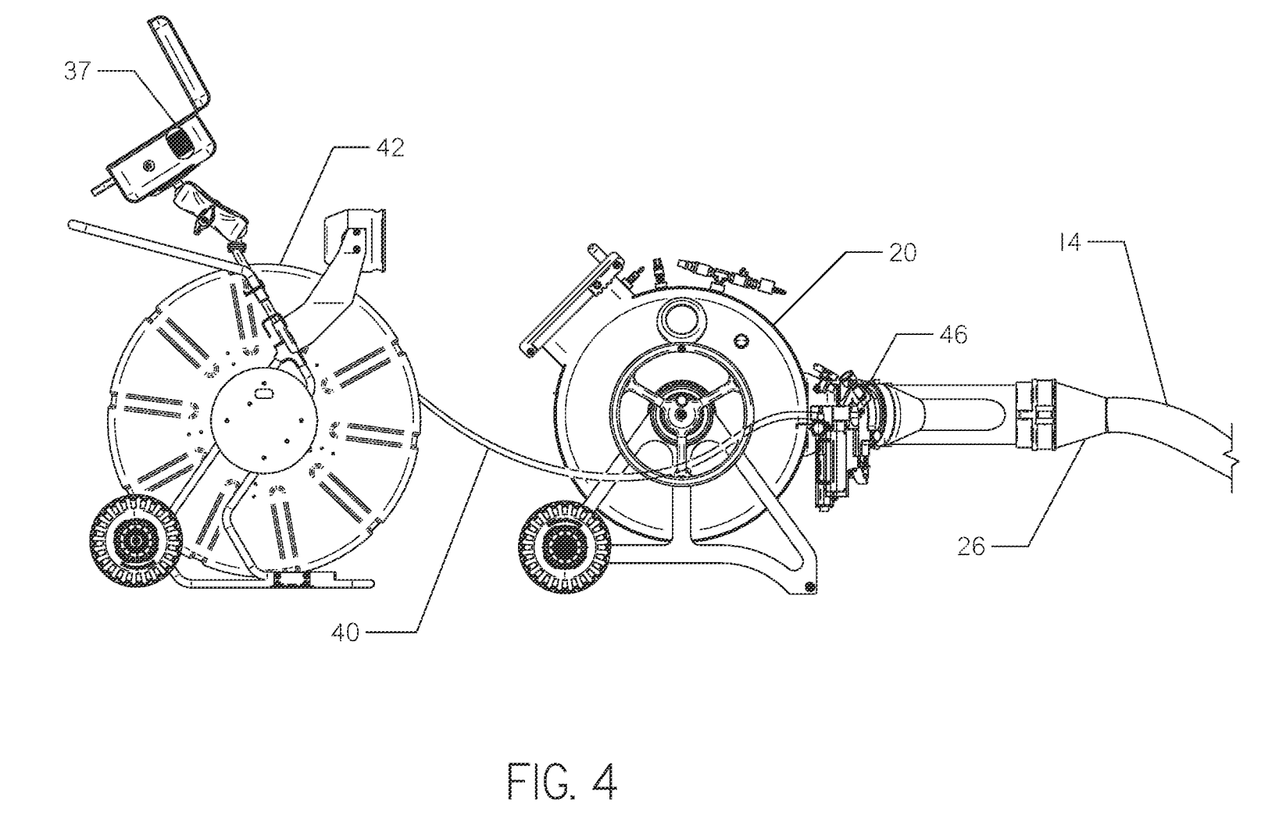
FIG. 4 is an enlarged view of the inversion drum and light source reel shown in FIG. 3.
Figure 5:
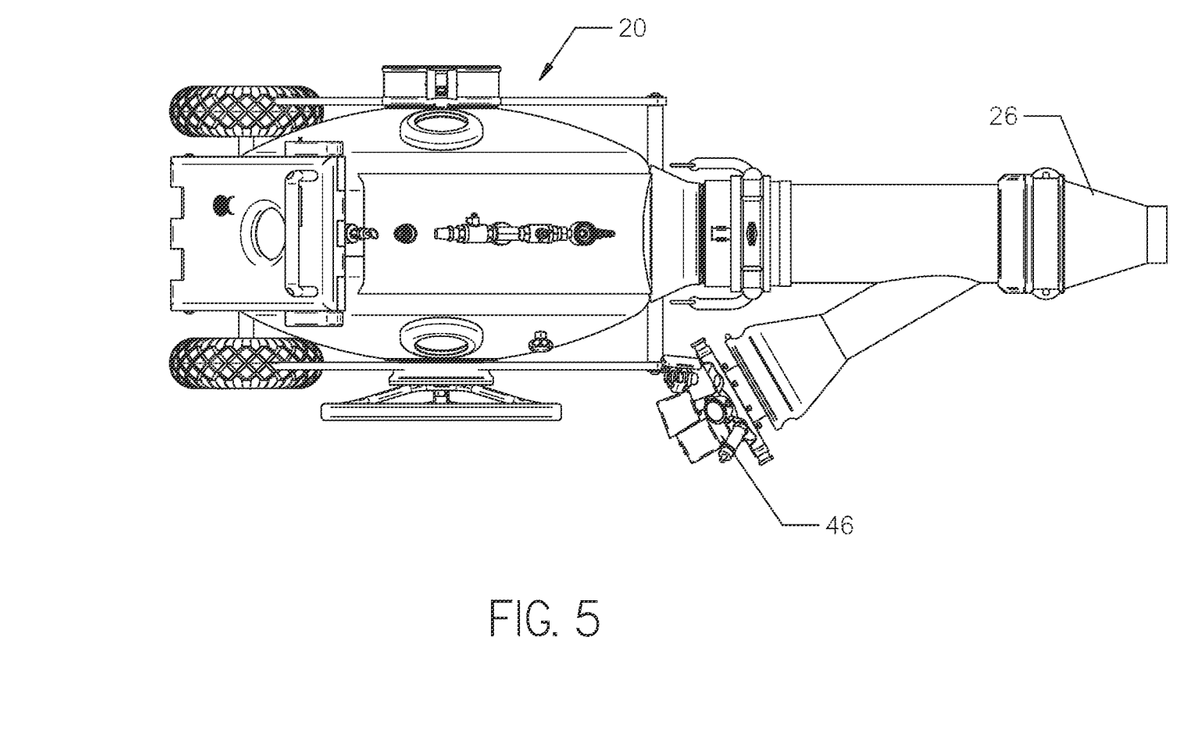
FIG. 5 is a top plan view of the inversion drum shown in FIG. 4.

After the wet liner 14 and bladder 30 are installed within the pipeline 12, the light source 36 with the LEDs 38 turned off, is pushed through the pipeline 12 using the power line 40. The light source 36 is pushed through the pipeline 12 until the light source 36 reaches the free end 28 of the wet liner 14 and the free end 34 of the bladder 30. Such position is considered a starting point 44 of the light source 36. The light source 36 and power line 40 are installed in the pipeline 12 through a propulsion unit 46 joined to the nozzle 26, as shown in FIGS. 3-5. The propulsion unit 46 joins the nozzle 26 via an opening 55, shown in FIGS. 6 and 7. The propulsion unit 46 is configured to grip and push the power line 40 into the pipeline 12.

Continuing with FIG. 3, once the light source 36 reaches the starting point 44, the LEDs 38 supported on the light source 36 are turned on. The power line 40 is then slowly pulled back through the pipeline 12 towards the inversion drum 20. The LEDs 38 cure the resin as the light source 36 is pulled through the pipeline 12. The propulsion unit 46 is configured to pull the power line 40 and light source 36 through the pipeline 12 at a steady speed in order to ensure that the light source 36 adequately cures all of the resin.

In some cases, the pipeline 12 being lined is too long to adequately push the light source 36 and power line 40 through the pipeline 12 to the light source's starting point 44. For example, slack in the power line 40 may prevent the light source 36 from ever reaching its starting point 44. Such issue is typically encountered when lining more than 100 feet of pipeline.

The starting point 44 may be accessible from the ground surface 16, allowing an operator to help pull the light source 36 to its starting point 44. However, in cases where the starting point 44 is not accessible from the ground surface 16, it may not be possible to adequately deliver the light source 36 to its starting point 44. The present disclosure provides a system and method for delivering the light source 36 to its starting point 44.

With reference to FIGS. 6-9, the system comprises a flexible and nontubular pull line 48. The pull line 48 may be made of any strong and flexible material, such as rope or nylon. The pull line 48 comprises a first section 50 joined to a second section 52 by a swivel 54. The first section 50 may be approximately 18 inches long and the second section 52 is approximately the same length as the bladder 30. The swivel 54 is preferably configured to permit the first and second sections 50 and 52 to freely rotate relative to one another. For example, the swivel 54 may be a double swivel, as shown in FIGS. 6-9. An end of each of the first and second sections 50 and 52 may be directly attached to the swivel 54, as shown in FIGS. 6-9. In alternative embodiments, the ends of the first and second sections may be attached to the swivel using one or more carabiners.

Figure 6:
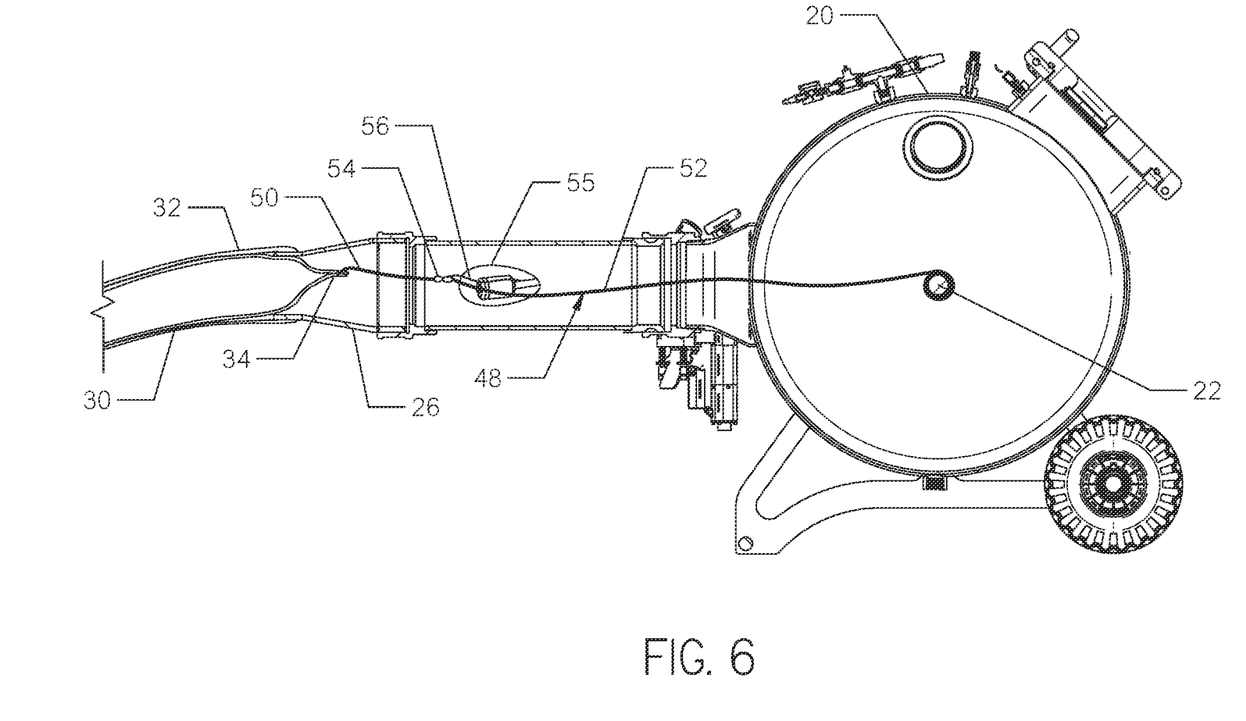
FIG. 6 is the side sectional view of the inversion drum shown in FIG. 4, but at a later stage in the operation. The wet liner has been fully inverted into an underground pipeline. The bladder has been partially inverted into the liner and the light source has been attached to the pull line.

Continuing with FIGS. 6 and 8, an end of the first section 50 of the pull line 48 is secured to the free end 34 of the bladder 30. The pull line 48 may be tied directly to the free end 34 of the bladder 30, as shown in FIG. 8. In alternative embodiments, the pull line may be secured to the free end of the bladder using a fastener, adhesive or other methods known in the art.

Figure 7:
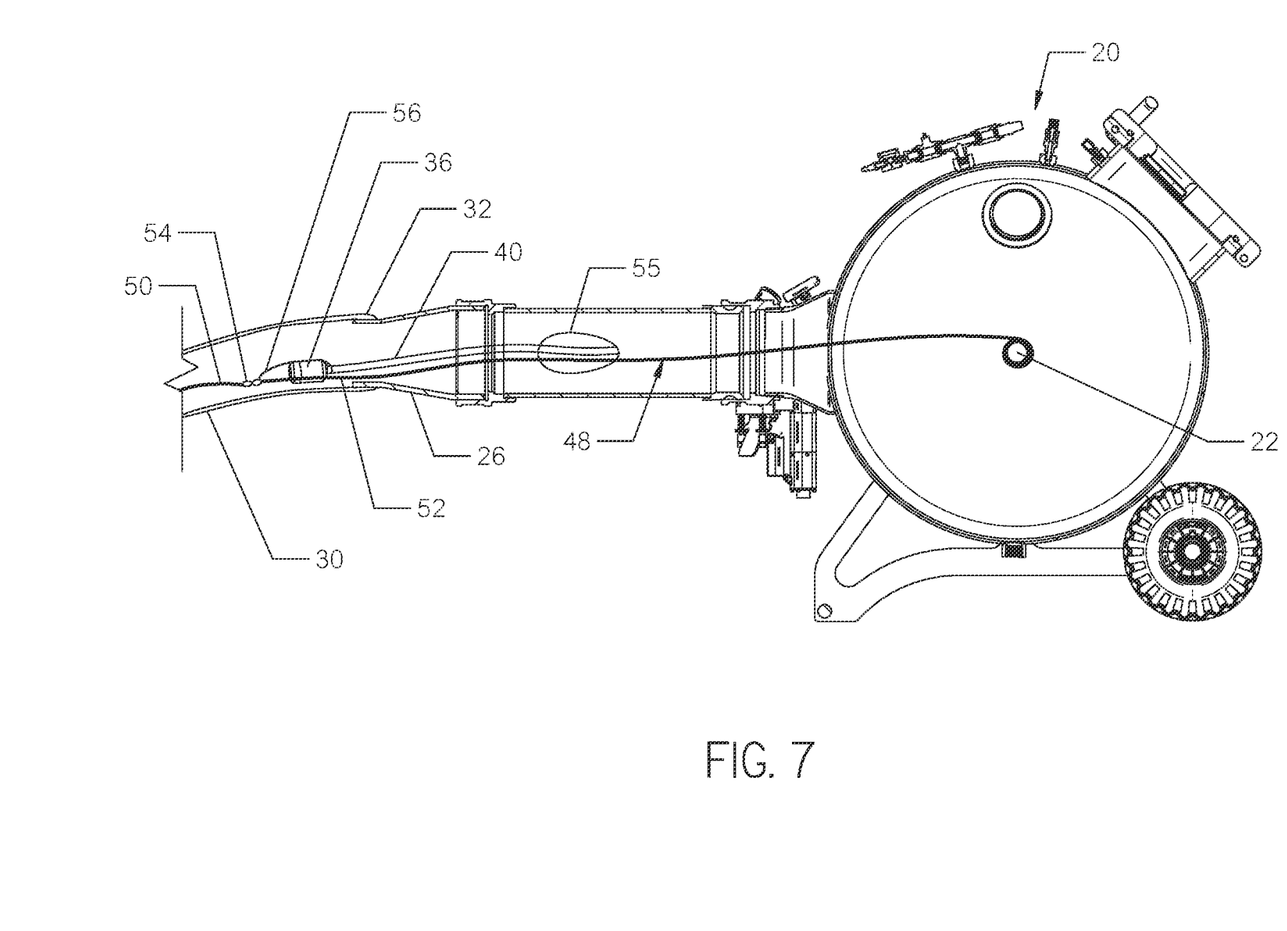
FIG. 7 is the side sectional view of the inversion drum shown in FIG. 6, but at a later stage in the operation. The bladder has pulled the light source and pull line into the interior of the bladder.

Continuing with FIG. 7, after the pull line 48 is secured to the free end 34 of the bladder 30, the pull line 48 and the bladder 30 are both wound around the reel 22 within the drum 20. The pull line 48 is wound around the reel 22 before the bladder 30. The wet liner 14 is subsequently wound around the reel 22 on top of the bladder 30.

Following installation of the pull line 48, the bladder 30, and wet liner 14 within the drum 20, the first end 25 of the wet liner 14 is disposed around the nozzle 26, as shown in FIG. 2. The wet liner 14 is then inverted throughout the length of the pipeline 12, as shown in FIGS. 1 and 2. The wet liner 14 may be inverted within the pipeline 12 using an air pressure of around 4-15 psi.

Once the wet liner 14 is installed within the pipeline 12, the fixed end 32 of the bladder 30 is disposed around the nozzle 26, as shown in FIGS. 6 and 7. An operator may then start inverting the bladder 30 within the wet liner 14. The bladder 30 may be inverted within the liner 14 using an air pressure of around 4-15 psi.

Once the bladder 30 has been inverted about halfway through the length of the wet liner 14, the free end 34 of the bladder 30 will be present adjacent the nozzle 26 and the swivel 54 will be present adjacent the opening 55, as shown in FIG. 6. Once the swivel 54 is accessible through the opening 55, the inversion process is paused so that the light source 36 may be attached to the pull line 48, as shown in FIGS. 6 and 7.

Figure 9:
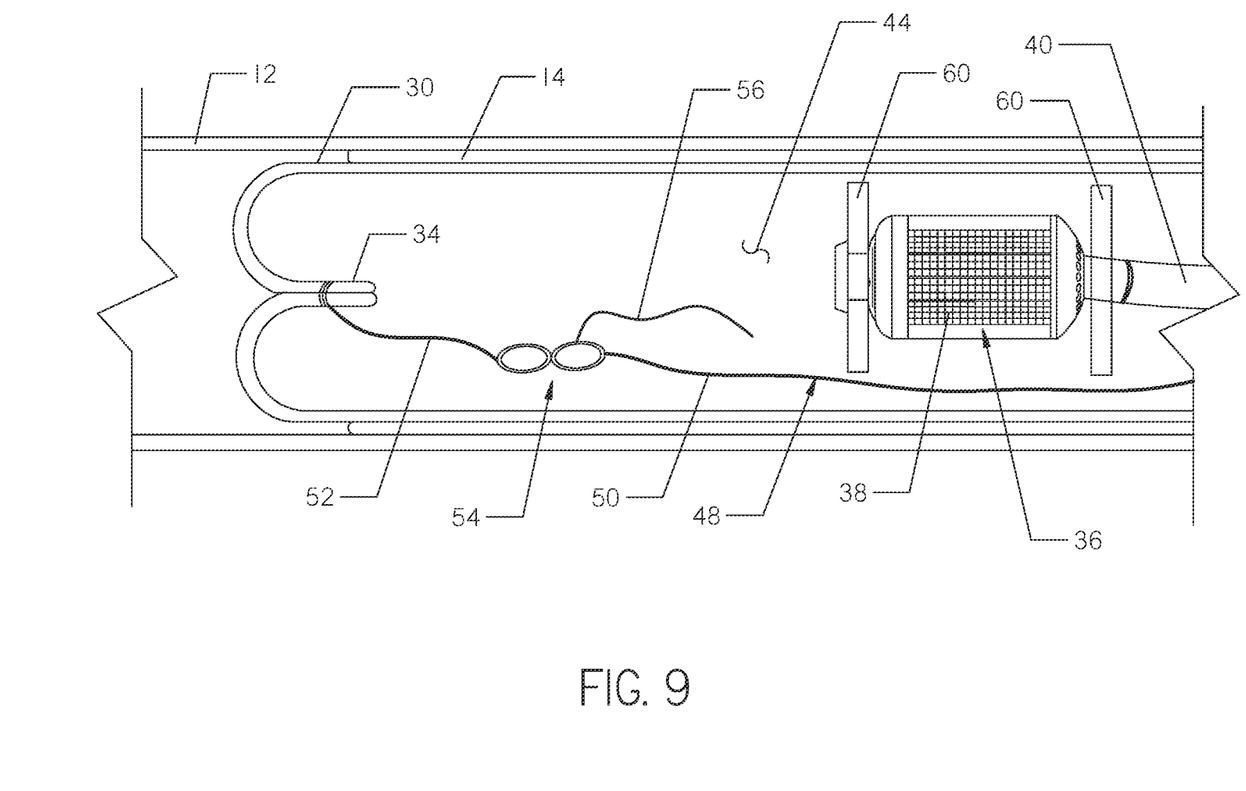
FIG. 9 is the sectional view of the pipeline shown in FIG. 8, but at a later stage in the operation. The light source has been released from the pull line.

The light source 36 is attached to the pull line 48 using a ligature 56, as shown in FIGS. 8 and 9. The ligature 56 is tied to swivel 54 and the power line 40, as shown in FIG. 8. The ligature 56 is tied so that it tightly holds the light source 36 against the pull line 48. The ligature 56 may comprise an elongate piece of string. For example, the ligature 56 may be #18 braided string. One or more fasteners 58 may be used to help secure the string in place on the light source 36, as shown in FIG. 8. The one or more fasteners 58 may comprise a rubber band, for example.

Figure 10:
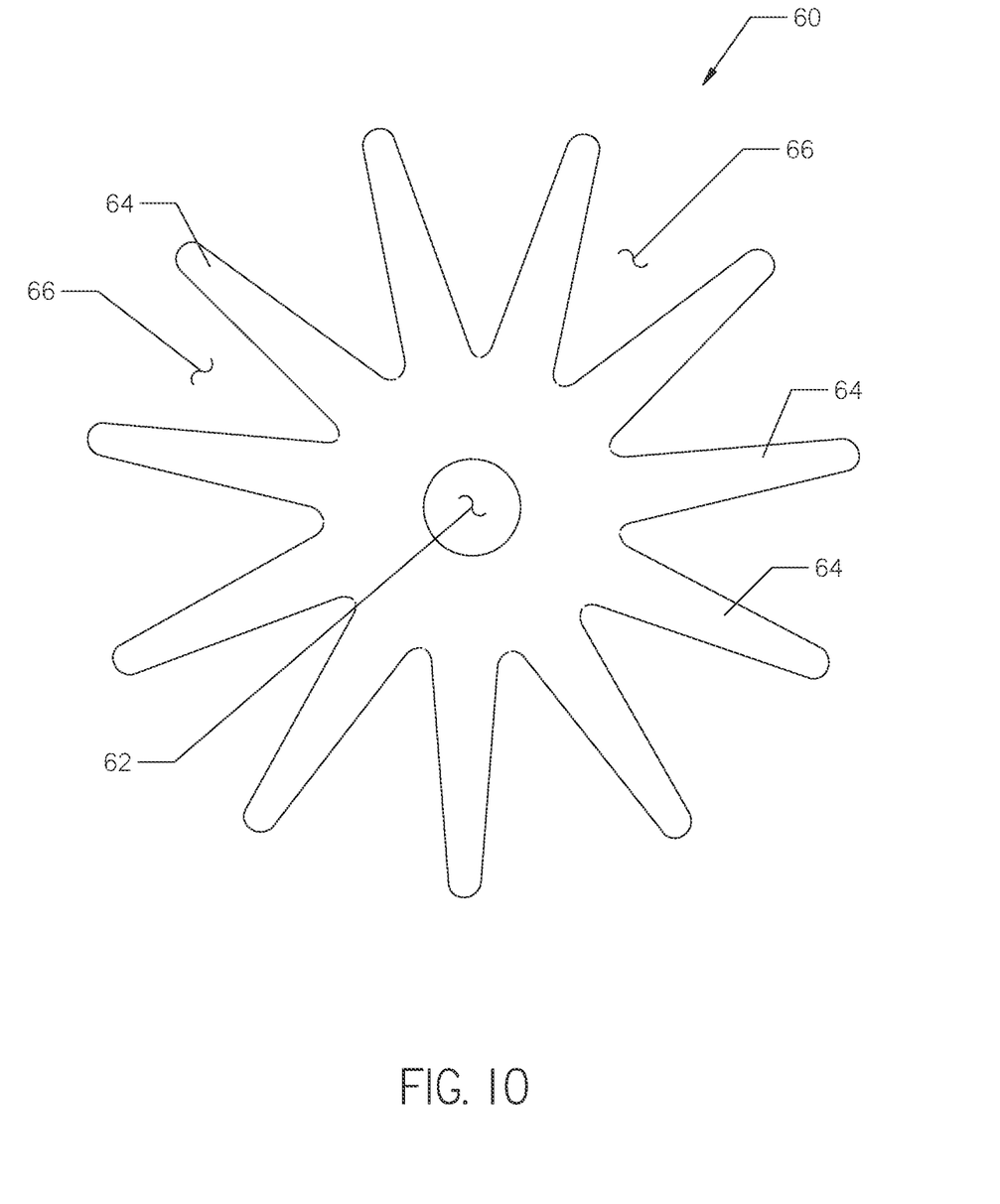
FIG. 10 is a side elevational view of one embodiment of a centering guide shown supported on the light source in FIG. 8.

Continuing with FIGS. 8-10, at least one centering guide 60 may be supported on the light source 36 and/or the power line 40. Two centering guides 60 are shown positioned on opposite ends of the light source 36 in FIGS. 8 and 9. The centering guides 60 keep the light source 36 from dragging against the sides of the bladder 30 as the light source 36 travels through the pipeline 12.

Continuing with FIG. 10, each centering guide 60 comprises a central passage 62 and a plurality of projecting support members 64. A portion of the light source 36 is supported within the central passage 62 of the centering guide 60. The projecting support members 64 contact the bladder 30 as the light source 36 moves within the pipeline 12. When the light source 36 is attached to the pull line 48, the pull line 48 may pass through an open space 66 between adjacent projecting support members 64.

The centering guide 60 may have the shape of a star, as shown in FIG. 10. In alternative embodiments, the centering guide may have different shapes and sizes. For example, the centering guide may be shaped like a flower.

Continuing with FIGS. 6-9, once the light source 36 is secured to the pull line 48, the inversion process may continue. As the remainder of the bladder 30 inverts within the wet liner 14, the bladder 30 pulls the pull line 48 and the attached light source 36 and power line 40 through the interior of the bladder 30, as shown in FIG. 7. The swivel 54 prevents the pull line 48 and power line 40 from twisting as they are pulled through the pipeline 12. The bladder 30 may pull the pull line 48 and light source 36 at a speed of up to 20 feet per minute.

Once the bladder 30 is completely inverted within the wet liner 14, the light source 36 will have been delivered to its starting point 44, as shown in FIGS. 8 and 9. Once the light source 36 is at the starting point 44, the LEDs 38 may be activated. The heat from the activated LEDs 38 will burn through the ligature 56, but not the pull line 48. The heat from the activated LEDs 38 will also burn through the ligature 56 and not simply melt the ligature. Thus, the heat from the light source 36 will cause the ligature 56 to break apart, releasing the light source 36 from the pull line 48, as shown in FIG. 9. The pull line 48 may subsequently fall away from the one or more centering guides 60, as shown in FIG. 9.

After the light source 36 has been released from the pull line 48, the light source 36 is pulled back through the bladder 30 using the power line 40. The light from the LEDs 38 cures the resin saturating the liner 14 as the light source 36 is pulled back towards the inversion drum 20.

Once the resin has been cured and the light source 36 is removed from the pipeline 12, the pull line 48 may be pulled back through the pipeline 12 towards the inversion drum 20. The pull line 48 pulls the bladder 30 out of the liner 14 as the pull line 48 is removed.

In alternative embodiments, the light source may be secured to the pull line using other fasteners known in the art that are configured to break apart in response to an action taken by the operator, such as activating the LED lights. In further alternative embodiments, the light source may be secured to the pull line using an adhesive known in the art to become nonadhesive upon exposure to heat from LEDs.

Changes may be made in the construction, operation and arrangement of the various parts, elements, steps and procedures described herein without departing from the spirit and scope of the invention as described in the following claims.

The invention claimed is:

1. A system comprising:
    a flexible tubular liner, the liner being extendable into an elongate configuration;
    a flexible tubular bladder, the bladder being extendable and inflatable within the extended liner and having opposed ends;
    a flexible and nontubular pull line having opposed ends, one end of the pull line being attached to the bladder adjacent one of the bladder's ends; and
    a selectively actuatable light source attached to the pull line adjacent one of the pull line's ends; in which the light source is attached to the pull line by a ligature that is independent of the pull line.

2. The system of claim 1, in which the light source is attached to the end of the pull line that is nearest the pull line's point of attachment to the bladder.

3. The system of claim 1, in which the light source, when actuated, causes the ligature, but not the pull line, to break apart.

4. The system of claim 1, in which the light source produces heat when actuated, and in which the ligature, but not the pull line, breaks apart in response to such heat.

5. The system of claim 1, in which the light source is powered by an elongate and flexible power line attached to the light source.

6. The system of claim 1, in which the ligature is number 18 braided string.

7. The system of claim 1, in which the pull line comprises:
    a first section attached to a second section using a swivel.

8. The system of claim 7, in which the light source is attached to the pull line adjacent the swivel.

9. The system of claim 1, further comprising:
    at least one centering guide supported on the light source.

10. The system of claim 1, further comprising:
    a fastener used to hold the ligature in place.

11. The system of claim 10, in which the fastener is a rubber band.

12. A method, comprising:
    causing a flexible tubular liner to extend within a tubular pipe; and
    causing a tubular bladder to extend within the extended liner, the bladder having a free end and a fixed end;
    in which extension of the bladder causes the following to travel within the bladder:
        a flexible and nontubular pull line, the pull line having a free end and a fixed end, the fixed end of the pull line attached to the bladder adjacent the bladder's free end; and
        a selectively actuatable light source attached to the pull line; in which the light source is attached to the pull line using a ligature that is independent of the pull line.

13. The method of claim 12, in which the bladder is attached to the pull line adjacent the fixed end of the pull line.

14. The method of claim 12, further comprising:
    prior to causing the bladder to extend into the liner, installing the bladder and pull line on a reel situated within a pressurizable chamber.

15. The method of claim 11, further comprising:
    causing the ligature, but not the pull line, to break apart in response to actuation of the light source.

16. The method of claim 15, which the ligature is caused to break apart by heat produced by the light source.

17. The method of claim 15, further comprising:
    keeping the pull line static within the bladder as the light source moves within the bladder.

18. The method of claim 12, further comprising:
    actuating the light source using an elongate and flexible power line attached to the light source.

19. The system of claim 1, in which the light source detaches from the ligature in response to an action taken at a location remote from the light source.

20. The system of claim 19, in which the action taken at the location is activating the light source.

* * * * *

UNITED STATES PATENT AND TRADEMARK OFFICE
CERTIFICATE OF CORRECTION

PATENT NO. : 11,391,406 B2
APPLICATION NO. : 17/095095
DATED : July 19, 2022
INVENTOR(S) : Dahl-Nielsen et al.

It is certified that error appears in the above-identified patent and that said Letters Patent is hereby corrected as shown below:

In the Claims

Column 6, Claim 15, Line 1, please delete "11" and substitute therefor "12."

Signed and Sealed this
Twenty-third Day of August, 2022

*Katherine Kelly Vidal*

Katherine Kelly Vidal
*Director of the United States Patent and Trademark Office*